United States Patent
Maeda

(10) Patent No.: US 7,604,900 B2
(45) Date of Patent: *Oct. 20, 2009

(54) CYLINDRICAL ALKALINE STORAGE BATTERY

(75) Inventor: Taishi Maeda, Takasaki (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 825 days.

This patent is subject to a terminal disclaimer.

(21) Appl. No.: 10/909,342

(22) Filed: Aug. 3, 2004

(65) Prior Publication Data

US 2005/0031949 A1 Feb. 10, 2005

(30) Foreign Application Priority Data

Aug. 4, 2003 (JP) ............................. 2003-286323

(51) Int. Cl.
- *H01M 6/10* (2006.01)
- *H01M 2/14* (2006.01)
- *H01M 2/16* (2006.01)
- *H01M 2/18* (2006.01)

(52) U.S. Cl. .................. 429/246; 429/247; 429/94; 429/129; 429/130; 429/163; 429/164

(58) Field of Classification Search .................. 429/94, 429/122, 126, 129, 130, 163, 164

See application file for complete search history.

(56) References Cited

U.S. PATENT DOCUMENTS

| | | | | |
|---|---|---|---|---|
| 4,507,368 A | * | 3/1985 | Hashimoto | .................. 429/62 |
| 5,458,993 A | * | 10/1995 | Terao et al. | .................. 429/94 |
| 5,631,102 A | * | 5/1997 | Spillman et al. | .............. 429/94 |
| 5,741,607 A | * | 4/1998 | Gilmour | ...................... 429/94 |
| 6,379,839 B1 | * | 4/2002 | Inoue et al. | .................. 429/176 |

(Continued)

FOREIGN PATENT DOCUMENTS

JP 53-160720 5/1977

(Continued)

OTHER PUBLICATIONS

Schreiber Translation, Inc. written translation of JP250964, published Apr. 10, 1990, translated Jan. 2009.*

(Continued)

*Primary Examiner*—Dah-Wei D Yuan
*Assistant Examiner*—Katherine Turner
(74) *Attorney, Agent, or Firm*—Westerman, Hattori, Daniels & Adrian, LLP

(57) ABSTRACT

A cylindrical alkaline storage battery suitable for increasing capacity thereof and arranged to prevent a short circuit between positive and negative electrodes. The battery has an electrically-conductive cylindrical outer can that accommodates therein an electrode group and an alkaline electrolyte. The electrode group is formed by rolling up a positive electrode, a negative electrode, and a separator. The positive electrode includes a main part and a terminal end part integrally formed to extend from one end of the main part and smaller in thickness than the main part. The terminal end part has an inner face thereof flush with an inner face of the main part. Between the positive electrode and the separator disposed on the outer face side of the positive electrode, an insulating protective piece is disposed at the boundary between the main part and terminal end part of the positive electrode.

8 Claims, 6 Drawing Sheets

U.S. PATENT DOCUMENTS

| | | | |
|---|---|---|---|
| 6,391,488 B1 * | 5/2002 | Shimizu et al. | 429/94 |
| 7,258,948 B2 * | 8/2007 | Miyamoto et al. | 429/137 |
| 2005/0031948 A1 * | 2/2005 | Maeda | 429/164 |
| 2007/0072072 A1 * | 3/2007 | Maeda | 429/164 |

FOREIGN PATENT DOCUMENTS

| | | | |
|---|---|---|---|
| JP | 2-50964 U | 4/1990 | |
| JP | 5-190158 A | 7/1993 | |
| JP | 2001-6723 A | 1/2001 | |

OTHER PUBLICATIONS

Japanese Office Action dated Jan. 8, 2008 of JP2003-286323.
Translation of Japanese Office Action dated Jan. 8, 2008 of JP2003-286323.

* cited by examiner

CYLINDRICAL ALKALINE STORAGE BATTERY

CROSS-REFERENCE TO THE RELATED ART

This nonprovisional application claims priority under 35 U.S.C. §119(a) on Patent Application No. 2003-286323 filed in Japan on Aug. 4, 2003, the entire contents of which are hereby incorporated by reference.

BACKGROUND OF THE INVENTION

1. Field of the Invention

The invention relates to a cylindrical alkaline storage battery, and more particularly, to a cylindrical alkaline storage battery adapted to prevent a short circuit between positive and negative electrodes.

2. Description of the Related Art

As alkaline storage batteries, there can be mentioned, for example, a nickel-cadmium rechargeable battery, a nickel-hydrogen rechargeable battery, etc., which contain different active materials. Among these alkaline storage batteries, there are cylindrical ones having a cylindrical outer can that accommodates therein an electrode group formed by strip-shaped negative and positive electrodes that are spirally wound with a separator interposed therebetween.

In this type of cylindrical alkaline storage battery, a short circuit can be caused between the positive and negative electrodes, and various proposals to prevent the short circuit have been made. For example, in case that a positive electrode obtained by cutting a sheet into a strip of a predetermined size with burrs on the cut ends thereof is rolled up together with a negative electrode and a separator to obtain an electrode group which is accommodated in an outer can, the burrs on the terminal end of the positive electrode can pierce through the separator disposed on the side close to the outer face of the positive electrode and come in contact with the negative electrode to produce a short circuit. In order to prevent the short circuit, an insulating protective piece is inserted between the terminal end of the positive electrode and the separator located on the outer face side of the positive electrode.

However, the terminal end of the positive electrode has not only burrs protruding outward in the diameter direction of the electrode group but also burrs protruding diametrically inwardly of the electrode group, resulting in a problem that a short circuit cannot sufficiently be prevented by the provision of the protective piece that is inserted between the terminal end of the positive electrode and the separator on the outer face side of the positive electrode. Specifically, the insertion of the protective piece causes the outer diameter of the electrode group to increase in the direction connecting the central axis of the electrode group and the terminal end of the positive electrode. Therefore, the electrode group is pressed by the rim and the circumferential wall of the outer can, particularly hard at the terminal end of the positive electrode when the electrode group is inserted into the outer can, and the burrs on the terminal end of the positive electrode protruding diametrically inwardly of the electrode group can pierce through the separator disposed on the side close to the inner face of the positive electrode and come in contact with the negative electrode, causing a short circuit.

The cylindrical alkaline storage battery is demanded to increase the battery capacity. By way of example in this regard, a cylindrical alkaline storage battery disclosed in Japanese Unexamined Utility Model Publication No. Sho 53-160720 has the positive electrode whose terminal end part is tapered toward the tip thereof to make the outer shape of the electrode group closer to a perfect circle, so that a clearance between the electrode group and the outer can is decreased, thereby increasing the volumetric efficiency to achieve high capacity.

However, the cylindrical alkaline storage battery disclosed in Japanese Unexamined Utility Model Publication No. Sho 53-160720 entails a problem that when the positive electrode is tapered by pressing or machining, a burr is produced on a ridge on the outer face of the terminal end part of the positive electrode, which pierces through the separator so disposed as to overlap the outer face of the terminal end part and causes a short circuit. Specifically, even in this cylindrical alkaline storage battery, the electrode group is not a perfect circle in cross section, and has its largest outer diameter in the direction connecting the central axis of the electrode group and the ridge of the terminal end part of the positive electrode. When the electrode group is inserted into the outer can, therefore, the terminal end part of the positive electrode is pressed hard at its ridge from both sides in the thickness direction by the rim and the circumferential wall of the outer can, to be compressed. As a result, the burr on the ridge pierces through the separator disposed on the outer face side of the positive electrode, to be in contact with the negative electrode, causing a short circuit.

SUMMARY OF THE INVENTION

An object of the invention is to provide a cylindrical alkaline storage battery arranged to prevent a short circuit between the positive and negative electrodes on both the inner and outer face sides of the terminal end part of the positive electrode, and suitable for increasing the battery capacity.

A cylindrical alkaline storage battery according to the invention comprises an electrically-conductive cylindrical outer can, and an electrode group accommodated in the outer can together with an alkaline electrolyte. The electrode group is formed by rolling up strip-shaped positive and negative electrodes with a separator interposed therebetween. The positive electrode includes a positive-electrode main part, and a positive-electrode terminal end part integrally formed to extend from one end of the positive-electrode main part and having a thickness smaller than the thickness of the positive-electrode main part, the terminal end part having an inner face thereof flush with an inner face of the positive-electrode main part. An insulating protective piece is interposed between the positive electrode and the separator extending along an outer face of the positive electrode to cover a boundary between the positive-electrode main part and the positive-electrode terminal end part.

In the cylindrical alkaline storage battery according to the invention, when the electrode group is inserted into the outer can, a large pressing force is exerted on the boundary between the positive-electrode main part and the positive-electrode terminal end part in the thickness direction. However, by mean of the protective piece interposed between the positive electrode and the separator disposed on the outer face side of the positive electrode to cover the boundary, a burr on a ridge of the terminal end part is prevented from piercing through the separator and coming in contact with the negative electrode to cause a short circuit. When the electrode group is inserted into the outer can, a large pressing force is exerted in the thickness direction on that part of the inner face of the positive electrode which is opposite to the ridge. However, this part of the inner face of the positive electrode is as a whole flat without a ridge, and therefore cannot pierce through the separator, come in contact with the negative electrode and produce a short circuit. Thus, this cylindrical alkaline storage battery can prevent a short circuit between the positive and negative electrodes on both sides close to the inner and outer faces of the positive-electrode terminal end part.

In the present invention, desirably, the protective piece has a thickness in the range of 10 μm to 200 μm inclusive, and a length in the range of 1 mm to 30 mm inclusive. The protective piece is desirably made from a material chosen from a group consisting of a polyolefin nonwoven fabric, a polyolefin sheet, and a polyolefin tape.

Further, it is desirable that an outer face of the positive-electrode terminal end part should be formed into an inclined plane so that the thickness of the positive-electrode terminal end part decreases gradually from the boundary toward the tip thereof.

The electrode group may have a cavity in the center thereof. In this case, it is desirable that the diameter of the cavity should be 30% or less of the outer diameter of the outer can.

In this desirable mode, since the diameter of the cavity in the center of the electrode group is 30% or less of the outer diameter of the outer can, the battery life shortening can be prevented.

Specifically, in case that an electrode group is formed by rolling up together a positive electrode, a negative electrode and a separator using a rolling core, when the rolling core is removed from the electrode group formed, a cavity corresponding to the rolling core is left in the center of the electrode group. In a case where the ratio of the diameter of the cavity to the outer diameter of the outer can is greater than 30%, oxygen gas produced on the positive electrode while the cylindrical alkaline storage battery is charged easily gathers in the cavity, which causes a delay in oxygen-gas reduction reaction on the negative electrode. When the oxygen-gas reduction reaction is delayed, the inner pressure increases, so that the safety valve operates and the alkaline electrolyte leaks, which shortens the battery life. In the desirable mode where the positive electrode, on the other hand, the negative electrode and the separator are rolled up using a rolling core of the outer diameter that is 30% or less of the outer diameter of the outer can, the diameter of the cavity formed around the central axis of the electrode group is reduced to 30% or less of the outer diameter of the outer can. Since the cavity is reduced in size, it is possible to disperse spaces for temporarily storing the oxygen gas throughout the battery. This allows the oxygen gas reduction reaction to proceed on the entire negative electrode efficiently, to thereby prevent a delay in the oxygen gas reduction reaction. According to this preferred mode, therefore, the leakage of the alkaline electrolyte caused by the safety valve operation due to increase in the inner pressure can be prevented, and the battery life shortening can be prevented.

Desirably, the cylindrical alkaline storage battery according to the invention further comprises a strip-shaped positive-electrode lead interposed between an end of the electrode group and a cover for the outer can. The positive-electrode lead has an end thereof welded to one face of the positive electrode, and a bent part formed by being bent between the electrode group and the cover. The electrode group has a cavity in the center thereof, corresponding to a rolling core used for forming the electrode group. A ratio (hereinafter referred to as "electrode-group section area ratio") of an area obtained by subtracting the transverse section area of the cavity from the transverse section area of the electrode group to an area obtained by subtracting the transverse section area of the cavity from the transverse section area of the inside of the outer can is 90% or greater in terms of percentage.

According to this mode, since the electrode-group section area ratio is 90% or greater, it is possible to prevent the increase in the internal resistance of the cylindrical alkaline storage battery due to splits that would be produced when the positive-electrode lead is bent.

Specifically, when the electrode-group section area ratio is small, a compressing force radially exerted on the electrode group by the circumferential wall of the outer can is small, so that the electrode group is tightened to a low degree. In a state where the electrode group is tightened to a low degree, when the positive-electrode lead welded to one face of the positive electrode is bent and the cover is then disposed in the opening of the outer can, a large load is exerted on that part of the positive electrode to which an end of the positive-electrode lead is welded. Thus, splits are produced in the just-mentioned part of the positive electrode, which increases the internal resistance of the storage battery. On the other hand, in this preferred mode where the electrode-group section area ratio is made 90% or greater to increase the compressing force exerted on the electrode group, the electrode group is tightened to a higher degree, so that the part of the positive electrode to which the end of the positive-electrode lead is welded is pressed and supported from both sides by the negative electrode through the separator, whereby the positive electrode is prevented from being deformed in the aforementioned part when the positive-electrode lead is bent. Hence, this mode can prevent formation of splits in that part of the positive electrode to which the end of the positive-electrode lead is welded, thereby preventing the increase in the internal resistance.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

Figure 1:
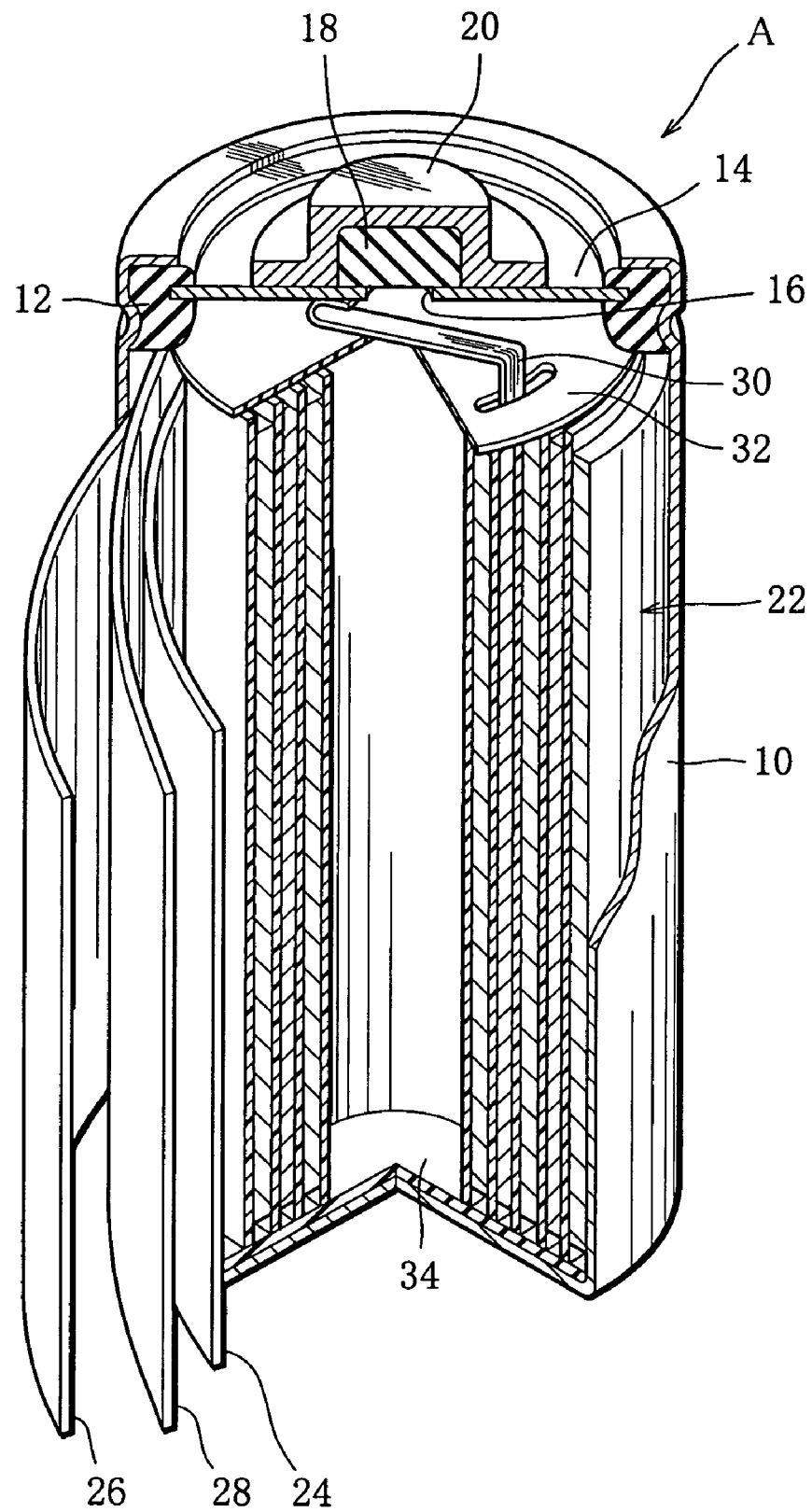
FIG. 1 is a perspective cutaway view of a cylindrical nickel-hydrogen rechargeable battery according to an embodiment of the invention.

Referring to the drawings attached, a cylindrical nickel-hydrogen rechargeable battery of AA size according to an embodiment of the invention (hereinafter referred to as "battery A") will be described in detail.

As shown in FIG. 1, the battery A comprises an outer can 10 formed in the shape of a bottomed cylinder open at the top. The outer can 10 has electrical conductivity, and functions as a negative-electrode terminal. An electrically-conductive cover plate 14 is placed in the opening of the outer can 10, with a ring-shaped insulating gasket 12 interposed therebetween. By crimping the rim of the outer can 10, the insulating gasket 12 and the cover plate 14 are fixed in the opening of the outer can 10.

The cover plate 14 has a gas release hole 16 in the center, and a valve body 18 of rubber is placed on the outer face of the cover plate 14 so as to cover the gas release hole 16. Further, a hat-shaped positive-electrode terminal 20 is fixed on the outer face of the cover plate 14 to cover the valve body 18. The positive-electrode terminal 20 presses the valve body 18 against the cover plate 14. Hence, the outer can 10 is normally closed air-tightly by means of the cover plate 14, the insulating gasket 12, and the valve body 18. When gas is produced inside the outer can 10 and the inner pressure in the outer can 10 increases, the valve body 18 is compressed, so that the gas is released from the outer can 10 through the gas release hole 16. The cover plate 14, the valve body 18, and the positive-electrode terminal 20 constitute a safety valve.

In the outer can 10 is held a columnar electrode group 22 with an alkaline electrolyte (not shown). The outermost circumferential part of the electrode group 22 is in direct contact with the circumferential wall of the outer can 10. The electrode group 22 consists of a positive electrode 24, a negative electrode 26, and a separator 28. The alkaline electrolyte can be, for example, an aqueous sodium hydroxide solution, an aqueous lithium hydroxide solution, an aqueous potassium hydroxide solution, or a mixture of two or more of these aqueous solutions.

Inside the outer can 10, a positive-electrode lead 30 is provided between an end of the electrode group 22 and the cover plate 14. An end of the positive-electrode lead 30 is connected to the positive electrode 24 while the other end is connected to the cover plate 14. Thus, the positive electrode 24 is electrically connected to the positive-electrode terminal 20 by means of the positive-electrode lead 30 and the cover plate 14. More specifically, the positive-electrode lead 30 is formed in the shape of a strip, and is bent and accommodated between the electrode group 22 and the cover plate 14 when the cover plate 14 is placed in the opening of the outer can 10. An end portion of the positive-electrode lead 30 on the side of the electrode group 22 is welded to one face of the positive electrode in a state that it is in face contact therewith. A circular insulating piece 32 is provided between the cover plate 14 and the electrode group 22, and the positive-electrode lead 30 extends through a slit formed in the insulating piece 32. A circular insulating piece 34 is further provided between the electrode group 22 and the bottom of the outer can 10.

Figure 2:
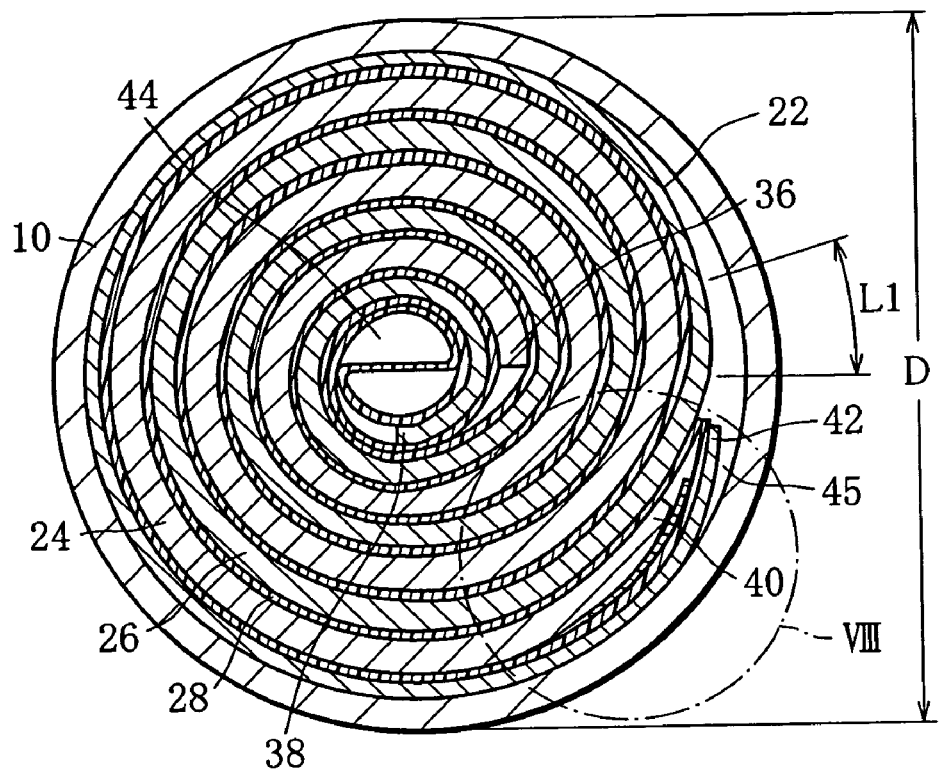
FIG. 2 is a transverse sectional view of the battery of FIG. 1.

Referring to FIG. 2, in the electrode group 22, the positive electrode 24 and the negative electrode 26 are alternately overlapped in the direction of diameter of the electrode group 22, with the separator 28 inserted therebetween.

Specifically, in order to form the group electrode 22, there are prepared a positive electrode 24, a negative electrode 26, and a separator 28 each formed in the shape of a strip. The positive electrode 24, the negative electrode 26, and the separator 28 inserted therebetween are rolled up from one end, using a rolling core, to form the electrode group 22. One end parts (beginning end parts) 36, 38 of the positive and negative electrodes 24, 26 are placed to the center side of the electrode group 22, while the other end parts (terminal end parts) 40, 42 of the positive and negative electrodes 24, 26 are placed to the circumference side of the electrode group 22. The negative electrode 26, which is longer than the positive electrode 24, begins inside the positive-electrode beginning end part 36 and extends beyond the positive-electrode terminal end part 40, describing a whirl, so that positive electrode 24 is sandwiched from both sides through the separator 28 by the negative electrode 26 over the entire length of the positive electrode 24. The separator 28 does not extend outside the outermost circumferential part of the electrode group 22. In other words, the negative electrode 26 forms the outermost circumferential part of the electrode group 22. At the outermost circumferential part of the electrode group 22, the negative electrode 26 is electrically connected with the outer can 10. At the negative-electrode terminal end part 42, the negative electrode 26 extends beyond the positive-electrode terminal end part 40 in the circumferential direction of the electrode group 22, to cover the radially outer face of the positive-electrode terminal end part 40 through the separator 28.

Figure 3A:
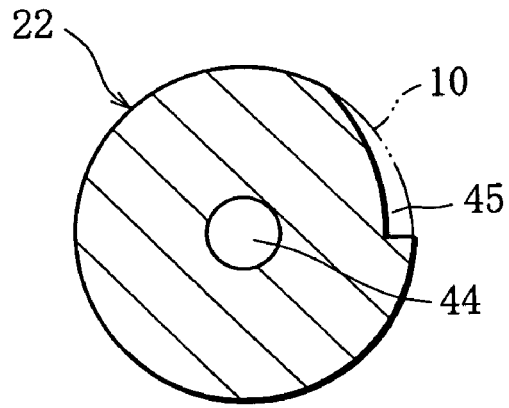
FIG. 3A is a schematic diagram showing the transverse section area of an electrode group shown in FIG. 1.
Figure 3B:
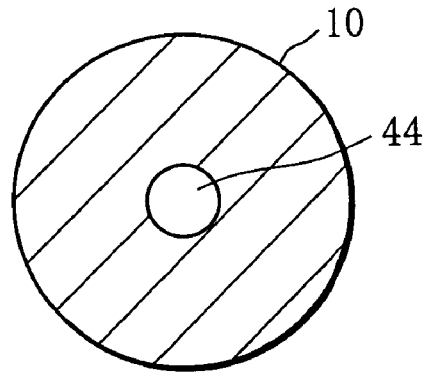
FIG. 3B is a schematic diagram showing the transverse section area obtained by subtracting the transverse section area of a cavity from the transverse section area of the inside of an outer can shown in FIG. 1.

After the electrode group 22 is formed by rolling up the positive electrode 24, the negative electrode 26, and the separator 28 together, the rolling core is drawn out. Hence, the electrode group 22 is formed at it center with a cavity 44 corresponding in shape to the rolling core. The transverse section area (shown by hatching in FIG. 3A) of the electrode group 22 is an area that is obtained by subtracting the sum of the transverse section area of the cavity 44 and the transverse section area of a space 45 between the electrode group 22 and the outer can 10 from the transverse section area of the inside of the outer can 10. It is desirable that a ratio (electrode-group section area ratio) of the transverse section area of the electrode group 22 (shown by hatching in FIG. 3A) to an area (shown by hatching in FIG. 3B) obtained by subtracting the transverse section area of the cavity 44 from the transverse section area of the inside of the outer can 10 should be 90% or greater in terms of percentage.

The material for the separator 28 can be, for example, nonwoven fabric of polyamide fiber, or nonwoven fabric of polyolefin fiber such as polyethylene or polypropylene with a hydrophilic functional group added.

Figure 4:
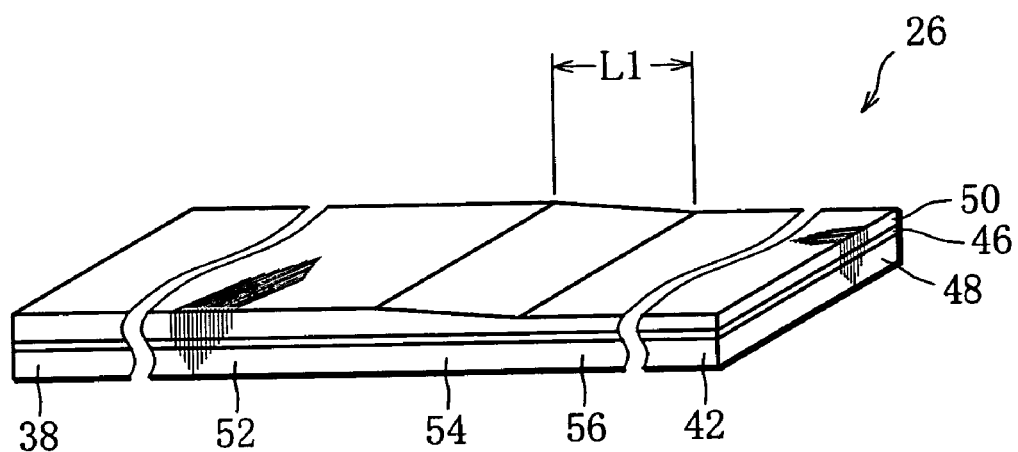
FIG. 4 is a perspective view showing, in a developed state, a negative electrode shown in FIG. 1.
Figure 5:
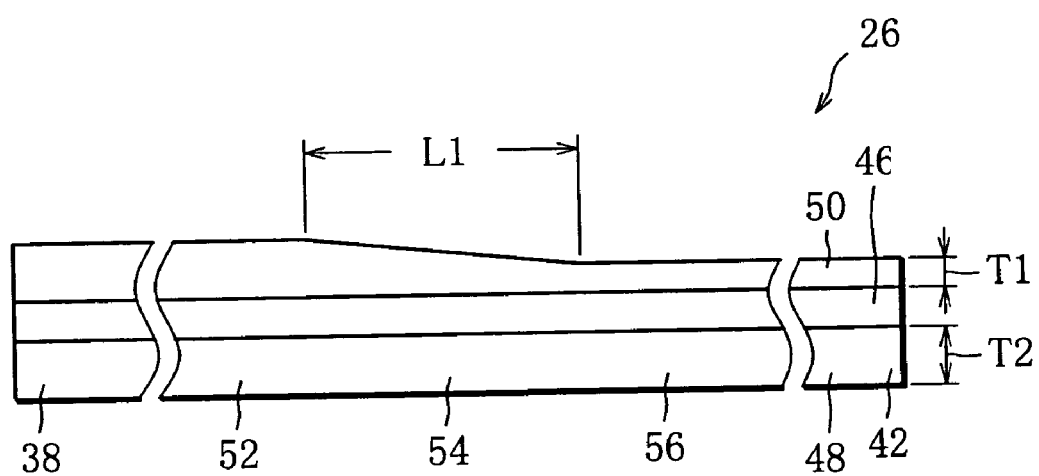
FIG. 5 is a side view of the negative electrode of FIG. 4.

The negative electrode 26, which is shown in a developed state in FIGS. 4 and 5, includes a strip-shaped electrically-conductive negative-electrode core body 46 on which a negative-electrode mixture is supported. The negative-electrode core body 46 is formed of a material sheet having a plurality of through-holes across the thickness thereof. For example, punching metal, a sintered metal powder substrate, expanded metal, and a nickel net can be used for the metal sheet. Punching metal and a sintered metal powder substrate, which is made by shaping and then sintering metal powder, are particularly suitable for the negative-electrode core body 46. For simplicity of illustration, the negative-electrode core body 46 is omitted in FIGS. 1 and 2.

Since the battery A is a nickel-hydroxide rechargeable battery, the negative-electrode mixture comprises hydrogen absorbing alloy particles capable of storing and releasing hydrogen and serving as a negative-electrode active material, and a binder.

The hydrogen absorbing alloy particles are ones that can store hydrogen electrochemically produced in the alkaline electrolyte during charging the battery A and can easily release the stored hydrogen during discharging. The hydrogen absorbing alloy is not limited to a particular one, and can be for example an $AB_5$ type such as $LaNi_5$ or $MmNi_5$ (Mm represents misch metal). The binder can be for example a hydrophilic or hydrophobic polymer.

Since the negative-electrode mixture is filled in the through-holes in the negative-electrode core body 46 and the negative-electrode core body 46 is formed in the shape of a sheet, the negative-electrode mixture is spread in layer over both faces of the negative-electrode core body 46. In the following, that layer of the negative-electrode mixture which covers the radially inner face of the negative-electrode core body 46 and which is directed toward the central axis of the electrode group 22 will be referred to as "inner hydrogen-storing alloy layer 48" or "inner alloy layer 48", whereas a layer of the negative-electrode mixture which covers the radially outer face of the negative-electrode core body 46 and is directed toward the outside of the electrode group 22 will be referred to as "outer hydrogen-storing alloy layer 50" or "outer alloy layer 50".

In the negative electrode 26, the thickness T2 of the inner alloy layer 48 is constant from the negative-electrode beginning end 38 to the negative-electrode terminal end 42, whereas the outer alloy layer 50 has a thickness varying between the negative-electrode beginning end 38 and the negative-electrode terminal end 42. As to the thickness of the outer alloy layer 50, the negative electrode 26 is divided into three sections in the lengthwise direction of the negative-electrode core body 46. Specifically, it is divided into a main part 52, a boundary part 54, and a thin part 56 in this order in the direction from the negative-electrode beginning end 38 to the negative-electrode terminal end 42 (see FIGS. 4 and 5).

The main part 52 of the negative electrode 26 forms the inside part of the electrode group 22, and the positive electrode 24 is disposed through the separator on both sides of the main part 52 of the negative electrode. In the main part 52, the thickness of the outer alloy layer 50 is constant and equal to the thickness T2 of the inner alloy layer 48.

The thin part 56 forms the outermost circumferential part of the electrode group 22, covers the outer face of the positive-electrode terminal end part 40 through the separator 28, and is in close contact with the circumferential wall of the outer can 10. The thickness T1 of the outer alloy layer 50 in the thin part 56 is constant in the lengthwise direction of the negative-electrode core body 46, and smaller than the thickness of the outer alloy layer 50 in the main part 52 or the thickness T2 of the inner alloy layer 48. In the thin part 56, therefore, the inner alloy layer 48 is thicker than the outer alloy layer 50.

The boundary part 54 is formed between the main part 52 and the thin part 45. It is desirable that the boundary part 54 should be positioned at a position different from that of the positive electrode terminal end part 40 in the circumferential direction of the electrode group 22. In the present embodiment, the main part 52 is disposed on the inner side of the positive-electrode terminal end part 40 with the separator interposed therebetween, although the circumferential positional relationship between the boundary part 54 and the positive electrode terminal end part 40 is not limited to a particular one. The boundary part 54 has a length L, and the thickness thereof changes in the lengthwise direction of the negative-electrode core body 46. More specifically, the thickness of the outer alloy layer 50 in the boundary part 54 decreases from the main part 52 side toward the thin part 56 gradually at an almost constant rate of change from the thickness T2 to the thickness T1.

As stated above, it is desirable that the negative electrode 26 should comprise the main part 52, the boundary part 54, and the thin part 56, where the thickness of the thin part 56 is smaller than that of the main part 52. However, the negative electrode 26 is not particularly limited in thickness which may be constant in the lengthwise direction.

The positive electrode 24 includes a strip-shaped electrically-conductive positive-electrode core body on which a positive-electrode mixture is supported. The positive-electrode core body is made of a metal material having a three-dimensional network structure, or in other words, a porous structure, for example a nickel metal material. The positive-electrode mixture is held in communicating holes in the metal material.

The positive-electrode mixture comprises a positive-electrode active material, an additive, and a binder, for example. The positive-electrode active material is not limited to a particular one. It can be nickel hydroxide particles or nickel hydroxide particles into which cobalt, zinc, cadmium or the like is dissolved. The additive can be, for example, yttrium oxide; a cobalt compound such as cobalt oxide, cobalt metal, or cobalt hydroxide; a zinc compound such as zinc metal, zinc oxide, or zinc hydroxide; or a rare-earth compound such as erbium oxide. The binder can be for example a hydrophilic or hydrophobic polymer.

Figure 6:
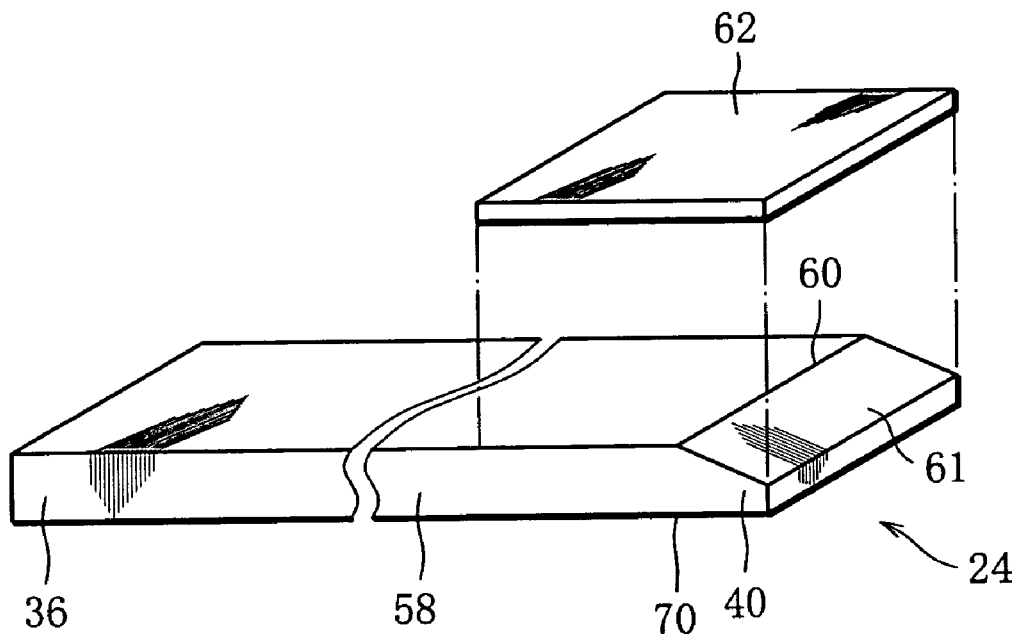
FIG. 6 is a perspective view showing, in a developed state, a positive electrode and a protective piece used in the battery of FIG. 1.
Figure 7:
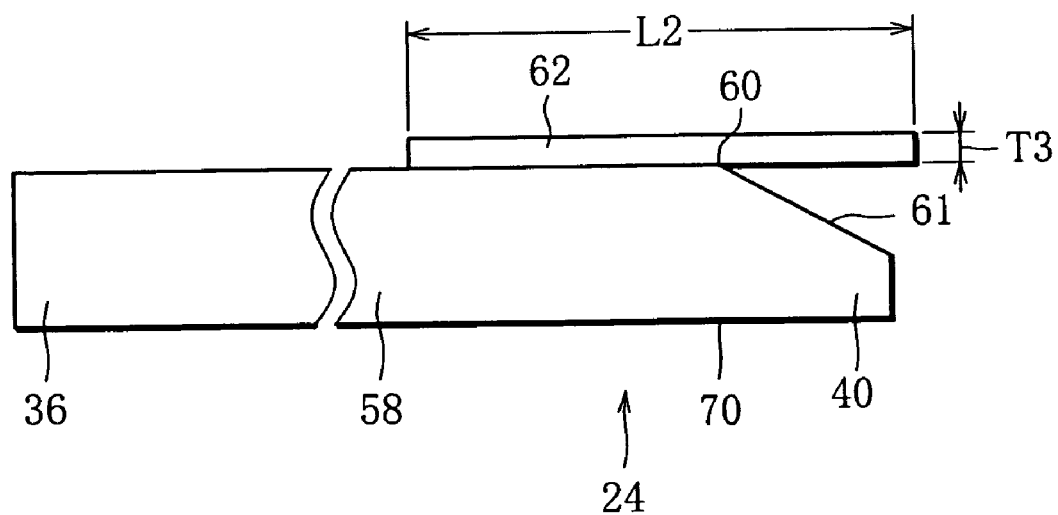
FIG. 7 is a side view showing the positive electrode and the protective piece in a developed state.

As shown in a developed state in FIGS. 6 and 7, the positive electrode 24 comprises a positive-electrode main part 58 having a constant thickness, and a positive-electrode terminal end part 40 integrally formed to extend from one end of the positive-electrode main part 58. The positive-electrode terminal end part 40 is thinner than the positive-electrode main part 58, and the inner face of the positive-electrode terminal end part 40 is flush with the inner face of the positive-electrode main part 58.

The positive-electrode terminal end part 40 has an outer face thereof formed into an inclined plane 61 extending toward its tip end (positive-electrode terminal end) from a ridge 60 that is at a boundary between the main part 58 and the terminal end part 40 of the positive electrode. The thickness of the positive electrode 24 decreases from the ridge 60 toward the tip end gradually at a constant rate of change. The ridge 60 and the inclined plane 61 of the positive-electrode terminal end part 40 is formed by machining or pressing, where burrs are produced on and around the ridge 60. In FIGS. 6 and 7, a protective piece 62 described below is shown in a developed state, together with the positive electrode 24.

Figure 8:
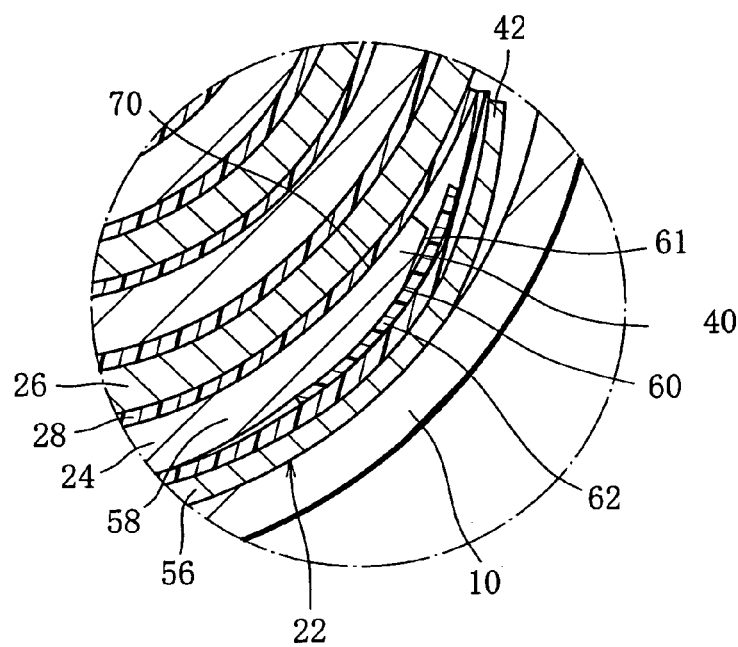
FIG. 8 is a enlarged view showing a region VIII shown in FIG. 2.

As shown on an enlarged scale in FIG. 8, the protective piece 62 is interposed between the outer face of the positive-electrode terminal end part 40 and that part of the separator 28 which covers the outer face of the positive-electrode terminal end part 40. In other words, the protective piece 62 is interposed between the positive electrode 24 and the separator 28 disposed on the outer face side of the positive electrode 24. The protective piece 62 has electrical nonconductivity, and is formed in the shape of a sheet so as to cover the entire ridge 60 of the positive electrode 24, as shown in a developed state in FIGS. 6 and 7.

The size of the protective piece 62 is so determined that when the electrode group 22 is inserted in the outer can 10, burrs on and around the ridge 60 will not pierce through the protective piece 62 and the separator 28.

Although not particularly limited, it is desirable that the thickness T3 of the protective piece 62 should be in the range of 10 μm to 200 μm inclusive. It is also desirable that the length L2 of the protective piece 62 should be in the range of 1 mm to 30 mm inclusive, as viewed in the lengthwise direction of the positive electrode 24 or in the circumferential direction of the electrode group 22.

It is assumed here that the thickness T3 of the protective piece 62 is a value that is obtained by averaging those values of the thickness of the protective piece 62 which are measured at a plurality of places thereof using a micrometer, after the battery A is disassembled and the protective piece 62 is taken out therefrom and dried. The length L2 of the protective piece 62 is a value that is measured using a ruler or the like in a state where the protective piece 62 is spread on a flat face, after it is taken out of the disassembled battery A and dried, as in the case of the measurement of the thickness T3.

As for the material and form of the protective piece 62, although not particularly limited, they are determined in such a manner that burrs on and around the ridge 60 will not pierce through the protective piece 62 and the separator 28 when the electrode group 22 is inserted in the outer can 10. It is desirable that the material be made of polyolefin polymer having both alkaline resistance and hydrophilic property, such as PP (polypropylene), and in the form of a non-woven fabric, a sheet or a tape.

The battery A can be fabricated by using ordinary methods. An example of fabrication methods of the positive electrode 24 and an example of fabrication (roll-up) methods of the electrode group 22 will be described below.

To fabricate the positive electrode 24, first, there are prepared a metal sheet such as a nickel sheet for the positive-electrode core body, and a positive-electrode mixture paste. Next, the positive-electrode mixture paste is applied on the metal sheet, and dried. Then the metal sheet applied with the positive-electrode mixture paste and dried is passed through between a pair of mill rolls to compress it from both sides in the thickness direction to adjust the thickness thereof. Subsequently, the inclined plane 61 is formed in the positive-electrode terminal end part 40 by cutting or pressing, and then the metal sheet is cut to a predetermined size to obtain the positive electrode 24. The positive-electrode mixture is partly removed, for example by applying ultrasonic waves, from that part of the positive electrode 24 to which the positive-electrode lead 30 is to be welded.

Figure 9:
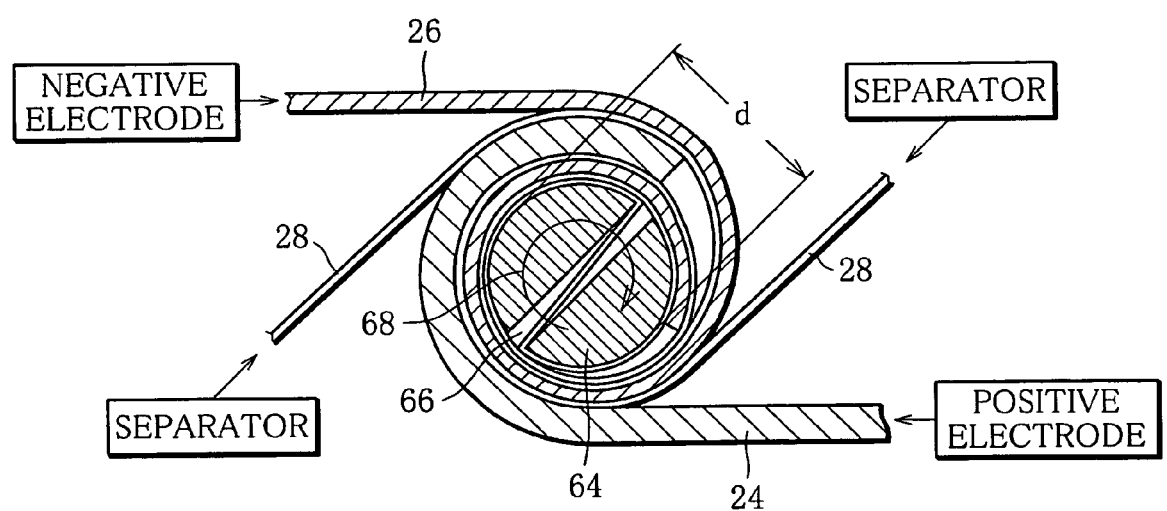
FIG. 9 is a diagram for explaining how to roll up the electrode group of FIG. 1.

As shown in FIG. 9, using a rolling core 64, the electrode group 22 is formed by rolling up the positive electrode 24 obtained by the above-described method, together with the negative electrode 26 and the separator 28 that are prepared separately. The column-shaped rolling core 64 has a slit 66 extending in the axial direction of the rolling core 64 and dividing the rolling core 64 into two pieces. The electrode group 22 is formed by rotating the rolling core 64 in the direction shown by an arrow 68 in FIG. 9 with the separator 28 inserted in the slit 66, while continuously drawing out the positive electrode 24, the negative electrode 26 and the separator 28 toward the rolling core 64. Although not particularly limited, the outer diameter d of the rolling core 64 is desirable to be 30% or less of the outer diameter D of the outer can 10 (see FIG. 2). In FIG. 9, the separator 28 is not hatched to avoid the complication of lines.

In the battery A having the aforesaid structure, since the positive-electrode terminal end part 40 has a smaller thickness, the electrode group 22 has an outer shape close to a perfect circle, so that the space 45 between the electrode group 22 and the circumferential wall of the outer can 10 (see FIG. 3A) is reduced and the volumetric efficiency is improved. Hence, the battery A is suitable for increasing the battery capacity.

In the battery A, a short circuit between the negative and positive electrodes is prevented on both the radially inner and outer faces of the positive-electrode terminal end part 40, and therefore, an improvement in quality can be achieved.

In the battery A, the positive-electrode terminal end part 40 has a ridge 60 on the outer face, and a burr is present on the ridge 60. However, the protective piece 62 is interposed between the ridge 60 and the separator 28 covering the ridge 60. The protective piece 62 covers the ridge 60 to prevent burrs on the ridge 60 from piecing through the separator 28 and coming in contact with the negative electrode 26, even if the ridge 60 is pressed hard in the radial direction of the electrode group 22 or in the thickness direction of the positive electrode 24 when the electrode group 22 is inserted into the outer can 10. Thus, the protective piece 62 prevents occurrences of a short circuit between the positive electrode 24 and the negative electrode on the outer face side of the positive-electrode terminal end part 40. When the electrode group 22 is inserted into the outer can 10, the inner face part 70 of the positive electrode 24 opposite to the ridge 60 is also pressed hard (see FIG. 7). However, since the inner face part 70 is flat as a whole without ridges and free from burrs, the inside part 70 cannot pierce through the separator 28 and does not cause a short circuit. Thus, a short circuit between the positive electrode 24 and the negative electrode is prevented also on the inner face side of the positive-electrode terminal end part 40. Since the positive-electrode terminal end part 40 is so formed that it becomes thinner toward its tip end, the edge of the positive-electrode terminal end part is not pressed hard when the electrode group 22 is inserted into the outer can 10, whereby a short circuit on the edge of the positive-electrode terminal end part is also prevented.

In the battery A, the thickness T3 of the protective piece 62 is desirably determined to be in the range of 10 μm to 200 μm inclusive, whereby a short circuit is prevented reliably, and the decrease in negative-electrode capacity and the increase in internal resistance are also prevented.

When the thickness T3 of the protective piece 62 is smaller than 10 μm, a burr on the ridge 60 will likely to pierce through the protective piece 62 and the separator 28, causing a short circuit. When the thickness T3 of the protective piece 62 is larger than 200 μm, the outer diameter of the electrode group 22 increases at the circumferential position in which the protective piece 62 is provided, and at this circumferential position, the thin part 56 of the negative electrode 26 strongly rubs against the rim and the circumferential wall of the outer can 10 when the electrode group 22 is inserted into the outer can 10, resulting in risks that the negative-electrode capacity will lower because of the inner and outer alloy layers 48, 50 being scraped from the negative electrode core body 46, and that cracks and/or splits will be produced in the negative-electrode core body 46, which will in turn cause the internal resistance of the battery A to increase.

The battery A where the length L2 of the protective piece 62 is desirably determined to be in the range of 1 mm to 30 mm inclusive allows the protective piece 62 to be easily inserted into the electrode group 22, and prevents the deterioration in charging/discharging characteristic.

When the length L2 of the protective piece 62 is smaller than 1 mm, it is difficult to insert the protective piece 62 in such a manner that the ridge 60 is covered by the protective piece 62 when the electrode group 22 is rolled up. When the length L2 of the protective piece 62 is larger than 30 mm, not only the volumetric efficiency is lowered because the protective piece 62 does not contribute to battery reaction, but also the charging/discharging characteristic deteriorates in a region where the protective piece 62 is inserted in the electrode group 22 since in this region the distance between the positive electrode 24 and the thin part 56 of the negative electrode 26 increases.

With the battery A in which the outer diameter d of the rolling core 64 used for forming the electrode group 22 and by extension the diameter of the cavity 44 of the electrode group 22 is 30% or less of the outer diameter D of the outer can 10, the battery life shortening is prevented.

When the ratio of the outer diameter of the rolling core 10 to the outer diameter D of the outer can 10 is greater than 30%, a larger cavity 44 is formed around the central axis of the electrode group 22, and oxygen gas produced on the positive electrode 24 during charging easily gathers in the cavity 44, which causes a delay in oxygen-gas reduction reaction on the negative electrode 26. When the oxygen-gas reduction reaction is delayed, the inner pressure increases, so that the safety valve operates and the alkaline electrolyte leaks, which shortens the battery life. In the battery A, the positive electrode 24, the negative electrode 26, the separator 28 are formed into the electrode group 22 using the rolling core 64 of the outer diameter d that is 30% or less of the outer diameter D of the outer can 10 before the electrode group 22 is inserted into the outer can 10, whereby the diameter of the cavity 44 around the central axis of the electrode group 22 is reduced to 30% or less of the outer diameter D of the outer can 10. Further, the cavity 44 is reduced in size to allow spaces for temporarily storing the oxygen gas to be dispersed throughout the battery in a dispersed manner. This allows the oxygen gas reduction reaction to proceed on the entire negative electrode 26 efficiently, and prevents a delay in the oxygen gas reduction reaction. Thus, the battery A prevents a leakage of the alkaline electrolyte caused by the safety valve operating due to increase in the inner pressure, and prevents the battery life shortening.

In the battery A arranged that the electrode-group section area ratio is 90% or greater, the increase in internal resistance is prevented.

When the electrode-group section area ratio is small, a compressing force radially exerted on the electrode group 22 from both sides by the circumferential wall of the outer can 10 is small, so that the electrode group 22 is tightened to a low degree. In a state where the electrode group is tightened to a low degree, when the positive-electrode lead 30 welded to one face of the positive electrode 24 is bent and the cover plate 14 is then placed in the opening of the outer can 10, a large load is exerted on that part of the positive electrode 24 to which an end of the positive-electrode lead 30 is welded. Thus, splits are produced in the aforementioned part of the positive electrode 24, resulting in the increase in the internal resistance. On the other hand, in the battery A arranged that the electrode-group section area ratio is made 90% or greater, the compressing force exerted on the electrode group 22 is increased, and thus the electrode group 22 is tightened to a high degree, so that the part of the positive electrode 24 to which the end of the positive-electrode lead 30 is welded is pressed and supported from both sides by the negative electrode 26 through the separator 28, whereby the positive electrode 24 is prevented from being deformed in the aforementioned part when the positive-electrode lead 30 is bent. The battery A prevents formation of splits in that part of the positive electrode 24 to which the end of the positive-electrode lead 30 is welded is prevented, and prevents the increase in the internal resistance.

The present invention is not limited to the above-described embodiment, and various modifications thereto can be made.

For example, the cylindrical alkaline storage battery according to the invention can be a cylindrical nickel-cadmium storage battery, and can be of AAA size or the like.

Figure 10:
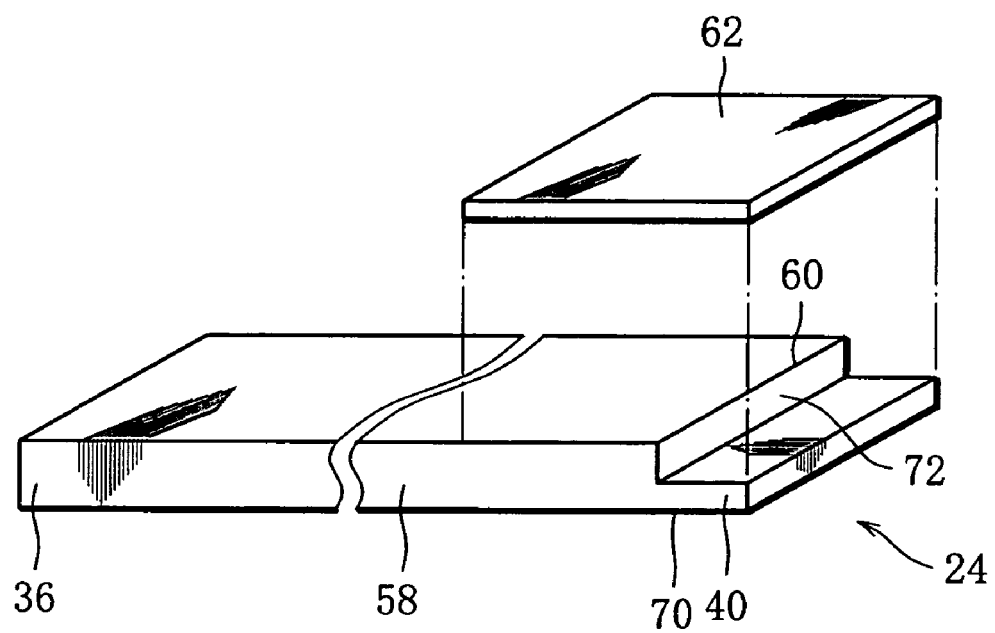
FIG. 10 is a perspective view showing a positive electrode and a protective piece according to a modified embodiment of the invention.
Figure 11:
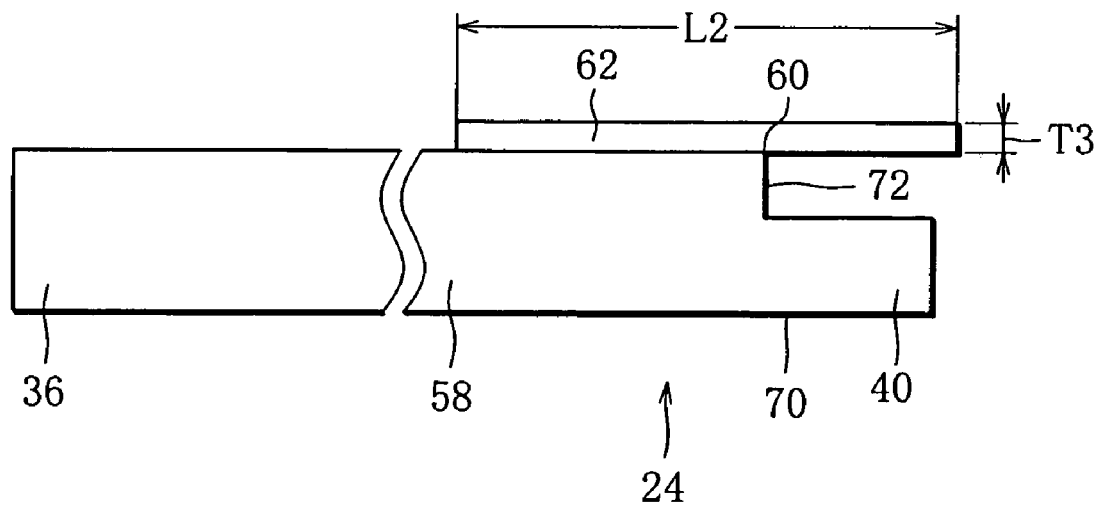
FIG. 11 is a side view showing the positive electrode and the protective piece of FIG. 10.

Instead of forming the outer face of the positive-electrode terminal end part 40 into an inclined plane 61, a step difference 72 may be formed as shown in FIGS. 10 and 11, so that the positive-electrode terminal end part 40 has a constant thickness smaller than the thickness of the positive-electrode main part 58.

The positive electrode 24 can comprise a positive-electrode core body of punching metal having opposite faces thereof on which a positive-electrode mixture is supported.

The protective piece 62 may have an adhesive layer on at least one side, so as to be adhered to the outer face of the positive-electrode terminal end part 40 and/or the separator 28.

EXAMPLES

Examples 1 to 6, Comparative Example 1

1. Assembly of Batteries

For each of Examples 1 to 6, there were assembled 100 cylindrical nickel-hydrogen rechargeable batteries of AA size having a structure shown in FIG. 1, 2, 4, 5, 6 or 7.

For Comparative Example 1, there were assembled 100 cylindrical nickel-hydrogen rechargeable batteries which were the same in structure as Example 1 except that the protective piece 62 was not provided.

The protective pieces 62 for Examples 1 to 6 were all made of nonwoven fabric of polypropylene fiber, the same material as that for the separators 28. Table 1 shows the size (thickness and length) of the protective piece 62.

TABLE 1

| | Protective Piece | | Battery characteristic |
|---|---|---|---|
| | Thickness (μm) | Length (mm) | Number of batteries producing short circuit |
| Example 1 | 80 | 8 | 0 |
| Example 2 | 80 | 15 | 0 |
| Example 3 | 100 | 8 | 0 |
| Example 4 | 150 | 8 | 0 |
| Example 5 | 200 | 30 | 0 |
| Example 6 | 250 | 30 | 1 |
| Comparative Example 1 | — | — | 4 |

2. Battery Characteristic Evaluation Test

For each of Examples 1 to 6 and Comparative Example 1, out of the 100 cylindrical nickel-hydrogen rechargeable batteries, how many batteries produced a short circuit was counted. The results are shown in Table 1.

From Table 1, it is clear that a short circuit was prevented better in Examples 1 to 6 in which the protective piece 62 covering the ridge 60 was interposed between the positive electrode 24 and the separator 28 than in Comparative Example 1 in which the protective piece 62 was not inserted.

What is claimed is:

1. A cylindrical alkaline storage battery, comprising:
   an electrically-conductive cylindrical outer can; and
   an electrode group accommodated in the outer can together with an alkaline aqueous solution as an alkaline electrolyte, the electrode group being formed by rolling up strip-shaped positive and negative electrodes with a separator inserted therebetween, wherein:
   the positive electrode includes a positive-electrode main part, and a positive-electrode terminal end part integrally formed to extend from one end of the positive-electrode main part and having a thickness smaller than a thickness of the positive-electrode main part,
   said positive-electrode terminal end part having an inner face thereof flush with an inner face of the positive-electrode main part and said positive-electrode terminal end part having an outer face that forms an inclined plane, wherein the inclined plane forms a boundary between the positive-electrode main part and the positive-electrode terminal end and a ridge is formed at the boundary between the positive-electrode main part and the positive-electrode terminal end, wherein the inner face of the positive-electrode terminal end part contacts the separator, and an insulating protective piece is interposed between the positive electrode and the separator extending along an outer face of the positive electrode to cover the boundary between the positive-electrode main part and the positive-electrode terminal end part.

2. The cylindrical alkaline storage battery according to claim 1, wherein said protective piece has a thickness in the range of 10 μm to 200 μm inclusive.

3. The cylindrical alkaline storage battery according to claim 1, wherein said protective piece has a length in the range of 1 mm to 30 mm inclusive.

4. The cylindrical alkaline storage battery according to claim 1, wherein said protective piece is made from a material chosen from a group consisting of a polyolefin nonwoven fabric, a polyolefin sheet, and a polyolefin tape.

5. The cylindrical alkaline storage battery according to claim 1, wherein an outer face of the positive-electrode terminal end art is formed into the inclined plane so that the thickness of the positive-electrode terminal end part decreases gradually from the boundary toward a tip thereof.

6. The cylindrical alkaline storage battery according to claim 1, wherein the electrode group has a cavity in a center thereof, and the cavity has a diameter that is 30% or less of an outer diameter of the outer can.

7. The cylindrical alkaline storage battery according to claim 1, further comprising:

a strip-shaped positive-electrode lead interposed between an end of the electrode group and a cover for the outer can, the positive-electrode lead having an end thereof welded to one face of the positive electrode, and a bent part formed by being bent between the electrode group and the cover, wherein the electrode group has a cavity in a center thereof, corresponding to a rolling core used for forming the electrode group, and a ratio of an area obtained by subtracting a transverse section area of the cavity from a transverse section area of the electrode group to an area obtained by subtracting the transverse section area of the cavity from a transverse section area of inside of the outer can is 90% or greater in terms of percentage.

8. The cylindrical alkaline storage battery according to claim 1, wherein the positive-electrode terminal end part has a constant thickness smaller than a thickness of the positive-electrode main part.

* * * * *